Patented Oct. 11, 1927.

1,644,965

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

WATERPROOF PLASTIC PORTLAND CEMENT AND COMPOSITION AND METHOD FOR MAKING THE SAME.

No Drawing.      Application filed January 5, 1925. Serial No. 664.

This invention relates to an improvement in the manufacture of Portland cement or hydraulic cement and the main object of the invention is to provide for making Portland cement more water proof and also for increasing the plasticity of the mortar, plaster, or concrete made from the cement. Another object of the invention is to produce material for this purpose which will be of low cost and at the same time effective in its result.

I have found that an effective water proofing and plasticizing agent may be produced from shale, clay or other naturally occurring earth containing hydrocarbon oil or bituminous matter in oil soluble form. For this purpose I may use for example a naturally occurring shale containing oil in so-called soluble form that is to say, hydrocarbon oil or bituminous matter which is capable of being extracted by use of a solvent for hydrocarbon oils. Or I may use a naturally occurring clay or shale containing some soluble hydrocarbon oil and, in order to increase the water proofing effect thereof, add a further amount of hydrocarbon oil thereto.

In carrying out my process I may use a shale such as is found in the vicinity of the Santa Maria field, Santa Barbara County, California, such shale containing about 20 to 35 per cent of hydrocarbon oil soluble in the usual solvents for hydrocarbon oil and capable of extraction by use of such solvents, and the composition of the inorganic or ash constituents (residue after ignition) being for example as follows:

| | |
|---|---|
| $SiO_2$ | 71.7 |
| $Fe_2O_3$ | 5.4 |
| $Al_2O_3$ | 13.7 |
| $CaO$ | 4.3 |
| Undetermined | 4.9 |

The silica in this residue may be considered as partly in combination with the alumina and oxide of iron in the form of silicates of aluminum and iron (clay, feldspar, etc.) but more or less free finely divided silica will of course be generally present.

As an example of one method of manufacture of the improved waterproof cement, a naturally occurring oil-bearing argillaceous shale or clay such as above referred to may be reduced by crushing or grinding to a suitable state of division for example one fourth inch mesh or finer and then added to cement clinker and ground therewith to produce a cement of the usual fineness for Portland cement. Or the oil bearing argillaceous shale or clay may be ground in the first place to suitable fineness, say 200 mesh or finer and then mixed with the ground Portland cement in any suitable mixing apparatus.

In case the shale used does not contain sufficient oil or oil-soluble bituminous matter to produce the desired water-proofing effect in the cement by addition of a reasonable amount of such shale, I may increase the water-proofing power of the shale by mixing therewith additional oily material consisting of hydrocarbon oil or oil-soluble bituminous matter, it being understood however that the shale used must in any case contain some oil soluble hydrocarbon or bituminous matter. The presence of such naturally occurring oil soluble matter is of very great advantage in facilitating the addition and mixing of additional quantities of oil or bituminous matter with the shale. I have found that a shale which contains no oil or oil-soluble bituminous matter is very difficult to mix thoroughly with oil and that it is practically impossible to cause all the particles of the shale to be thoroughly wetted with the oil or oil-soluble bituminous matter. On the other hand in a shale which naturally contains some oily material, namely oil or oil-soluble bituminous matter, such oily material, even though present in relatively small proportion, is very uniformly distributed throughout the shale and in fact every particle may be considered as coated or wetted with such oil or oil-soluble bituminous matter and when a shale in this condition is mixed with additional oily material a very complete and uniform mixture is readily obtained and all the particles are thoroughly and evenly wetted.

As an example of this method of procedure I may crush the relatively lean oil shale to a suitable state of division, say 100 mesh and then add to the ground product any desired proportion of hydrocarbon oil or bituminous matter of suitable consistency. For example, I may use three hundred pounds of crude oil per ton of shale. The mixing may be done in any suitable mixing device and may be facilitated by heating if desired. Such mixture may then be ground with the Portland cement clinker, being added for example, in proportion of 12 pounds of the mixture to 100 pounds of Portland cement clinker and the whole may then be ground together to a suitable fineness for Portland cement, or the mixture may be added to Portland cement in any of the manners above described. It will be understood that I may use for this purpose of enriching a relatively lean shale not only hydrocarbon oil but other hydrocarbon or bituminous materials containing oil-soluble constituents, such as tar or asphalt and I may use a naturally occurring shale containing relatively small amounts of such tars or asphalts as well as those containing oil.

The above described feature of my invention is particularly advantageous, not only because it permits shales relatively lean in oil content to be used, such shales by reason of their low oil content being unsuited for other uses or for use in preparing such water-proofing composition without enriching, but also because it permits the use of shales of varying oil content while yet obtaining a uniform product. This may be accomplished by varying the proportion of oil or bitumnnous matter added depending upon the amount of such material naturally present in the shale so as to give a uniform total soluble oil or bituminous content in the product.

I have also found that in some cases it is especially advantageous to use a composition containing a considerable amount of amorphous silica or hydrated colloidal silica, such as diatomaceous or infusorial earth. The silica in this form not only forms a very effective carrying agent for the oil, but also improves the plasticity of the cement. For example, a very effective water-proofing and plasticizing composition according to my invention may comprise or consist of a naturally occurring diatomaceous or infusorial earth or shale consisting mainly or partly of diatomite or similar material together with oil-soluble bitmumious matter or hydrocarbon. Such a diatomaceous shale is found for example at or near Casmalia, California, and has approximately the following composition:

|                          | Per cent. |
|--------------------------|-----------|
| Loss on ignition         | 27.67     |
| Silica                   | 53.75     |
| Iron oxide and alumina   | 14.45     |
| Calcium oxide            | 0.99      |
| Magnesium oxide          | 1.17      |

In addition to diatomite and bituminous material the composition may include more or less clay occurring for example naturally with the diatomaceous earth and may also include more or less lime or magnesia either occurring naturally with the diatomaceous earth or added thereto.

The "loss or ignition" in the above analysis represents bituminous or oily matter as well as more or less other organic substances, but the water-proofing properties of the resulting composition depend largely or entirely upon the bituminous and oily matter present. This bituminous or oily matter is largely or entirely present in the form of hydrocarbon oils soluble in the usual solvents of such oils.

The method of preparing and mixing such diatomaceous shale with the cement may be substantially as above described, the shale being either ground with the cement, or ground separately and then mixed. Furthermore an artificially enriched mixture of hydrocarbon oil or asphalt, etc., with diatomaceous shale of relatively low natural oil content may be used in the same manner as described above in connection with argillaceous shale. For this purpose the hydrocarbon oil or asphalt may be added to a naturally occurring diatomaceous shale containing some soluble hydrocarbon or bituminous matter, either before or during the grinding thereof, in order to increase its water-proofing properties.

The term diatomaceous shale as herein used is intended to include not only diatomite so-called, but any diatomaceous or infusorial earth containing or including diatomaceous or infusorial material, irrespective of the presence of other constituents such as shale, limestone, magnesia, etc., occurring naturally with the diatomaceous or infusorial material or added thereto. In some cases shales containing other forms of silica in partly hydrated condition for example tufa, have been found to be the equivalent of diatomaceous shales and my invention includes the use of such equivalents in place of diatomaceous earth.

Furthermore the composition may be made by mixing with more or less pure diatomaceous earth or diatomite, a suitable proportion of bituminous shale or other shaly or earthy material containing oil-soluble bituminous or oily material or both, with or without the addition thereto of further amounts of oil or oil-soluble bituminous matter as above set forth so as to obtain any desired proportions of shale (including clay, feldspar, etc.), amorphous silica, and soluble oil or bituminous matter.

In connection with any of the compositions above described I may add any other suitable constitutents either by way of dilution or for the purpose of modifying the effect of the composition in any way, for example, for modifying either the drying, or the primary or secondary set or other properties as may be desired. Such modifying agents may consist of or comprise chloride, fluoride, sulphate, silicate or fluosilicate of magnesium, calcium, or zinc, and such agent may be used in any suitable proportion, for example in the proportion of one to ten parts of the modifying agent per one hundred parts of any of the above described waterproofing and plasticizing compositions.

The amount of water-proofing and plasticizing composition added to the Portland cement clinker or to the Portland cement will depend on the results desired and on the use to which the cement or concrete is to be put. For use as a water-proof plaster it may be desirable to use one part of the water-proofing and plasticizing material to ten to twenty parts of Portland cement clinker or of Portland cement as the case may be.

In actual practice it has been found that it is sufficient to add 1 part of oil-containing shale to 12 parts of Portland cement.

In order to obtain the best results and maximum water-proofing and plasticizing effect I prefer to use, as a composition for addition to the Portland cement, a mixture of hydrocarbon and bituminous matter with earthy material in which at least 25 per cent of the hydrocarbon and bituminous matter is in oil-soluble form, such mixture being either a naturally occurring product or an enriched mixture as above described. Such a mixture is widely different in composition and properties from what is generally known as "oil shale," in which only 2 or 3 or, at the most, 5 per cent of the hydrocarbon and bituminous is oil-soluble, the remainder comprising insoluble hydrocarbons and bituminous matter which yield true oil only upon destructive distillation. I have found that a shale whose hydrocarbon and bituminous content is largely or chiefly in oil-soluble form gives much better results than the ordinary "oil-shales" above referred to.

Considerable variation is permissible in the actual percentage of oily matter in the composition to be mixed with the cement, good results being obtained with the use of compositions containing from 2 to 50 per cent oil-soluble bituminous matter and hydrocarbon (these percentages being based on total composition).

While I have described my invention in connection with Portland cement, it may be used with similar advantages as to waterproofing and plasticizing effect with other hydraulic cements.

I have disclosed the use of either an oil-containing shale or argillaceous material, or an oil-containing diatomaceous material, or of a mixture, of such materials either naturally occuring or artificially produced. My invention should therefore be understood to include the use of any earthy material, such earthy material comprising either argillaceous or diatomaceous earth or both, and containing oil-soluble bituminous matter or hydro-carbon as above set forth.

Such earthy material may also be mixed, according to my invention, with suitable inorganic modifying agents as above described. These inorganic modifying agents, such as chloride, fluoride, sulphate, silicate, or fluosilicate of magnesium, calcium, or zinc, may in some cases act as set-regulating agents, or they may act as plasticizing agents or as waterproofing agents, and my invention therefore includes the use, in connection with an earthy material containing oil-soluble material, of an inorganic modifying agent having any one or more of the above desirable properties, or of two or more such agents in combination.

Furthermore such modifying agents, particularly those which are hydroscopic such as calcium chloride may have the primary function of retaining water in the composition and in the cement or mortar made therefrom, this being of advantage both in facilitating the mixing or intergrinding of the composition with the Portland cement or Portland cement clinker and in aiding the application and setting of the cement or mortar produced as above described.

What I claim is:

1. A Portland cement composition containing Portland cement mixed with a material including a naturally occurring mixture of earthy material and oil-soluble material, such material being in quantity sufficient to impart waterproofing and plasticizing qualities.

2. A Portland cement composition consisting of a mixture of Portland cement and a naturally occurring mixture of earthy material and oil-soluble hydrocarbon together with added liquid oil-soluble material, such materials being in quantity sufficient to impart waterproofing and plasticizing qualities.

3. The method of making a Portland cement composition having plastic and waterproof qualities which consists in intergrinding with Portland cement clinker a composition including a naturally occurring mixture of earthy material and oil-soluble hydrocarbon, such composition being in quantity sufficient to impart waterproofing and plasticizing qualities.

4. The process which consists in mixing oil soluble material with naturally occurring earth containing oil-soluble material, such materials being in quantity sufficient to impart waterproofing and plasticizing qualities, and intergrinding the resulting mixture with Portland cement clinker to form a finely divided product.

5. The process which consists in making a water-proofing and plasticizing composition by mixing with a naturally occurring earthy material containing oil-soluble material an additional amount of oil soluble material, such mixture being in quantity sufficient to impart waterproofing and plasticizing qualities, and mixing with the resulting product a set-regulating agent, and intergrinding the resulting composition with Portland cement clinker to produce finely divided product.

6. A water-proofing and plasticizing composition for addition to hydraulic cement, comprising a naturally occurring earthy material containing oil-soluble material mixed with a further amount of oil-soluble material in addition to that which is naturally contained in said earthy material.

7. A Portland cement composition containing Portland cement mixed with material including a naturally occurring mixture of argillaceous shale and oil soluble material, such mixture being in quantity sufficient to impart waterproofing and plasticizing qualities.

8. A Portland cement composition consisting of a mixture of Portland cement and a naturally occurring mixture of argillaceous shale and oil soluble hydrocarbon together with added oily material, the added material being in quantity sufficient to impart waterproofing and plasticizing qualities.

9. A Portland cement composition comprising a mixture of Portland cement and a waterproofing material including an argillaceous shale having oil naturally occurring therein, said waterproofing material being used in the proportion of one of waterproofing material to ten to twenty parts of Portland cement material.

10. A Portland cement composition containing Portland cement mixed with a waterproofing and plasticizing material including argillaceous shale containing at least two percent of oil soluble hydrocarbon naturally occurring therein.

In testimony whereof I have hereunto subscribed my name this 27th day of December, 1924.

HARRY V. WELCH.